United States Patent
Xu et al.

(10) Patent No.: US 10,846,643 B2
(45) Date of Patent: Nov. 24, 2020

(54) METHOD AND SYSTEM FOR PREDICTING TASK COMPLETION OF A TIME PERIOD BASED ON TASK COMPLETION RATES AND DATA TREND OF PRIOR TIME PERIODS IN VIEW OF ATTRIBUTES OF TASKS USING MACHINE LEARNING MODELS

(71) Applicant: Clari Inc., Sunnyvale, CA (US)

(72) Inventors: Xin Xu, Sunnyvale, CA (US); Lei Tang, Sunnyvale, CA (US); Venkat Rangan, Sunnyvale, CA (US)

(73) Assignee: CLARI INC., Sunnyvale, CA (US)

( * ) Notice: Subject to any disclaimer, the term of this patent is extended or adjusted under 35 U.S.C. 154(b) by 274 days.

(21) Appl. No.: 15/882,993

(22) Filed: Jan. 29, 2018

(65) Prior Publication Data

US 2018/0150783 A1    May 31, 2018

Related U.S. Application Data

(63) Continuation-in-part of application No. 15/246,513, filed on Aug. 24, 2016, now Pat. No. 10,430,239.

(51) Int. Cl.
*G06Q 10/06* (2012.01)
*G06F 17/18* (2006.01)
(Continued)

(52) U.S. Cl.
CPC ....... *G06Q 10/06375* (2013.01); *G06F 9/485* (2013.01); *G06F 17/18* (2013.01);
(Continued)

(58) Field of Classification Search
CPC ........ G06F 9/4887; G06F 17/18; G06F 9/485; G06Q 10/06375; G06Q 10/0633;
(Continued)

(56) References Cited

U.S. PATENT DOCUMENTS

| 8,417,715 B1* | 4/2013 | Bruckhaus | G06Q 10/04 707/758 |
| 10,255,085 B1* | 4/2019 | Valsaraj | G06N 20/20 |

(Continued)

OTHER PUBLICATIONS

Chen et al. ("Gray Relation Analysis and Multilayer Functional Link network sales forecasting model for perishable food in convenience store", Expert Systems with Application 36 (2009)) (Year: 2009).*

(Continued)

*Primary Examiner* — Duy Khuong T Nguyen
*Assistant Examiner* — Kevin X Lu
(74) *Attorney, Agent, or Firm* — Womble Bond Dickinson (US) LLP

(57) ABSTRACT

A request is received for determining a task completion rate of each of a first set of tasks associated with a set of task attributes. The first set of tasks are scheduled to be completed within a first timer period. An MAPE score is calculated or obtained for each of the completion rate predictive models, which is determined based on prior predictions performed in a second time period in the past. The duration of the second time period is a multiple of the first time period. One of the predictive models is selected based on the MAPE scores of the predictive models, where the selected model has the lowest MAPE score amongst the predictive models in the set. In another embodiment, a predictive model is selected further based on the volatility scores of the predictive models. A model with a combination of lowest MAPE score and volatility score is selected.

21 Claims, 9 Drawing Sheets

(51) Int. Cl.
G06N 3/02 (2006.01)
G06N 20/00 (2019.01)
G06F 9/48 (2006.01)
G06N 3/04 (2006.01)
G06N 20/20 (2019.01)

(52) U.S. Cl.
CPC .............. G06N 3/02 (2013.01); G06N 3/0445 (2013.01); G06N 20/00 (2019.01); G06N 20/20 (2019.01); G06Q 10/0633 (2013.01); G06Q 10/0639 (2013.01)

(58) Field of Classification Search
CPC .. G06Q 10/0639; G06N 3/0445; G06N 20/20; G06N 20/00; G06N 3/02
See application file for complete search history.

(56) References Cited

U.S. PATENT DOCUMENTS

| | | | | |
|---|---|---|---|---|
| 2003/0182250 A1* | 9/2003 | Shihidehpour | ........ | G06Q 10/04 706/21 |
| 2018/0005253 A1* | 1/2018 | Megahed | ........... | G06Q 30/0202 |

OTHER PUBLICATIONS

Ylinen et al., ("Measuring Forecast Accuracy: The Complete Guide", www.relexsolutions.com/measuring-forecast-accuracy/, Nov. 9, 2017). (Year: 2017).*

Agrawal, D., Schorling, C., Market share forecasting: An empirical comparison of artificial neural networks and multinomial logit model, Journal of Retailing, 72(4), pp. 383-407, ISSN: 0022-4359, Winter 1996.

Booth, E. et al.. Hydrologic Variability of the Cosumnes River Floodplain. San Francisco Estuary & Watershed Science. vol. 4, Issue 2, Article 2, Sep. 2006.

Dalkey, N., Helmer, O., An experimental application of the delphi method to the use of experts. United States Air Force under Project RAND, Contract No. AF 49(638)-700, Apr. 1, 1963.

Duncan, B., Elkan, C. Probabilistic modeling of a sales funnel to prioritize leads, Department of Computer Science and Engineering, University of California, CA, pp. 1751-1758. <http://dx.doi.org/10.1145/2783258.2788578>, Aug. 10-13, 2015.

Hastie, T. et al., The elements of statistical learning: Data mining, inference, and prediction, Stanford, CA: Springer, 2008.

Hochreiter, S. et al., Long Short-Term Memory. Neural Computation, 9(8):1735-1780, 1997.

* cited by examiner

| Attributes/ Categories | Current Time Period (Q) | Q-1 | Q-2 | Q-3 | Q-4 |
|---|---|---|---|---|---|
| Closed | 12 → ? | 10 → 10<br>$C^{(1)}_{closed} = 100\%$ | 12 → 12<br>$C^{(2)}_{closed} = 100\%$ | 12 → 12<br>$C^{(3)}_{closed} = 100\%$ | 14 → 14<br>$C^{(4)}_{closed} = 100\%$ |
| Commit | 14 → ? | 12 → 9<br>$C^{(1)}_{commit} = 75\%$ | 10 → 8<br>$C^{(2)}_{commit} = 80\%$ | 10 → 7<br>$C^{(3)}_{commit} = 70\%$ | 15 → 9<br>$C^{(4)}_{commit} = 60\%$ |
| Best Case | 6 → ? | 5 → 3<br>$C^{(1)}_{bestcase} = 60\%$ | 8 → 4<br>$C^{(2)}_{bestcase} = 50\%$ | 6 → 3<br>$C^{(3)}_{bestcase} = 50\%$ | 8 → 5<br>$C^{(4)}_{bestcase} = 62.5\%$ |
| Pipeline | 14 → ? | 15 → 3<br>$C^{(1)}_{pipeline} = 20\%$ | 16 → 4<br>$C^{(2)}_{pipeline} = 25\%$ | 1M → 2<br>$C^{(3)}_{pipeline} = 11.1\%$ | 16 → 5<br>$C^{(4)}_{pipeline} = 31.3\%$ |
| New Tasks | - | 50 | 52 | 51 | 37 |
| Total Tasks | - | 75 | 80 | 75 | 70 |

FIG. 4

METHOD AND SYSTEM FOR PREDICTING TASK COMPLETION OF A TIME PERIOD BASED ON TASK COMPLETION RATES AND DATA TREND OF PRIOR TIME PERIODS IN VIEW OF ATTRIBUTES OF TASKS USING MACHINE LEARNING MODELS

CROSS-REFERENCE

This application is a continuation-in-part (CIP) of co-pending U.S. patent application Ser. No. 15/246,513, filed Aug. 24, 2016, which is incorporated by reference in its entirety.

FIELD OF THE INVENTION

Embodiments of the present invention relate generally to data processing by a data processing system. More particularly, embodiments of the invention relate to predicting task completion of a time period based on task completion rates and data trend of prior time periods using machine learning.

BACKGROUND

Forecasting and projecting progress of tasks is prevalent across all different organizations. Both resource planning and company's executives rely on an accurate projection. Conventional practice is to ask each person (e.g., project manager, account representative, designer) to gather rough estimates and aggregate the information to provide an overall projection. However, such projections are based on the gut feelings of individuals. Such projections tend to be inaccurate and the process is inefficient.

BRIEF DESCRIPTION OF THE DRAWINGS

Embodiments of the invention are illustrated by way of example and not limited to the figures of the accompanying drawings in which like references indicate similar elements.

FIG. 4 is a block diagram illustrating a conversion-based probability process according to one embodiment.

DETAILED DESCRIPTION

Figure 1A:
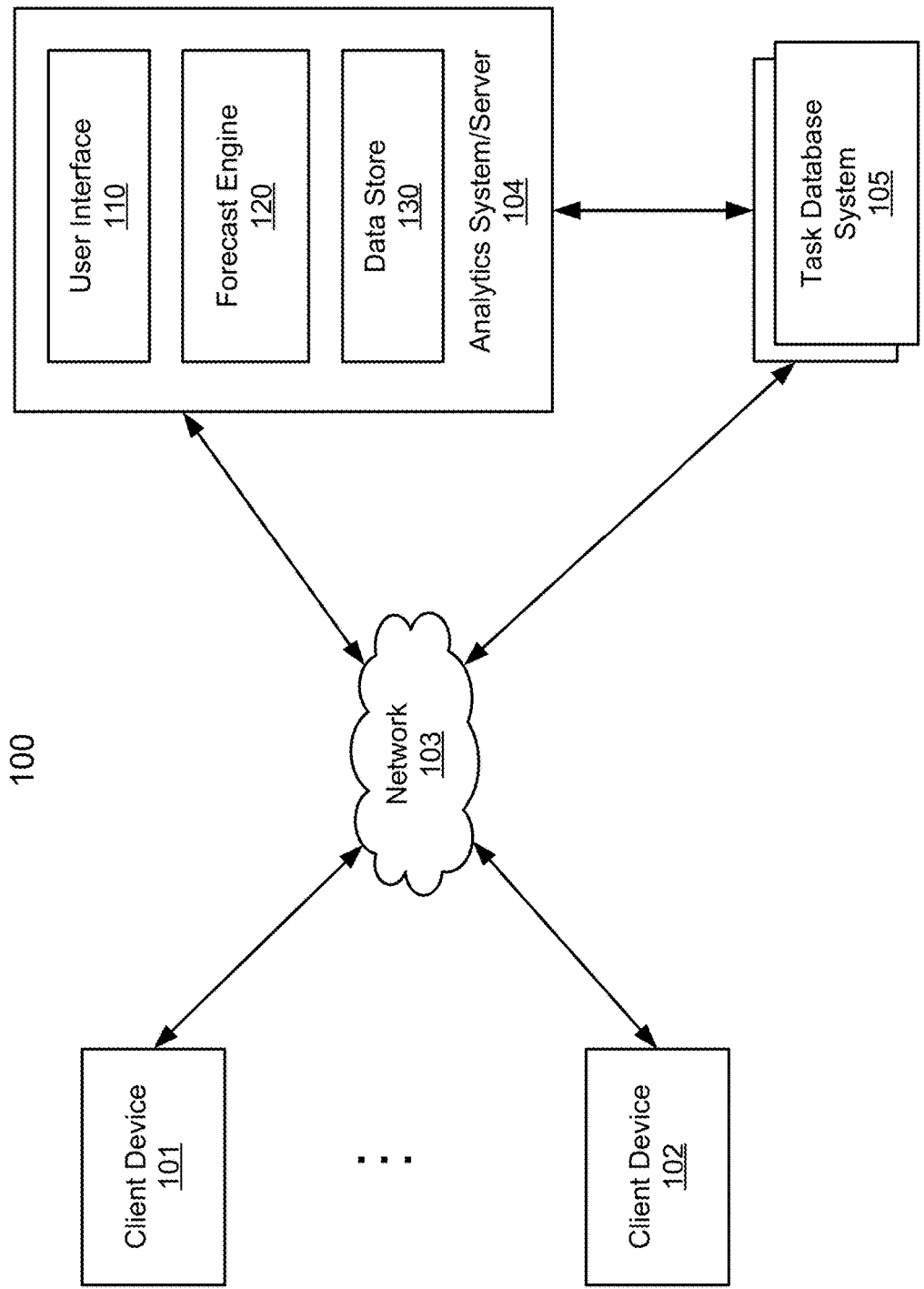
FIGS. 1A and 1B are block diagrams illustrating a network configuration according to certain embodiments of the invention.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

According to some embodiments, a machine-learning based system is designed to maintain a set of difference machine-learning predictive models. Each predictive model is configured to predict or determine a probability of a task or tasks to be completed within a predetermined time period. Different ones of the predictive models may have difference accuracy under different circumstances. The prior predictions of the models are periodically evaluated. For each of the predictive models, an accuracy score is calculated based on the prior predictions in view of the actual task completion rates of past several time periods. In addition, a volatility score of the predictions between consecutive time periods is also calculated for each predictive model. Alternatively, the accuracy score and/or volatility score may be calculated dynamically in response to a request. When a subsequent request is received to determine a completion rate of a current time period, one of the predictive models is selected based on their respective accuracy score and/or volatility score. The selected predictive model is then utilized to predict the completion rate of a task or tasks for the current time period.

In one embodiment, a predictive model having the best accuracy score and/or lowest the volatility score is selected to predict the task completion rate of the current time period. In a particular embodiment, an accuracy score is calculated based on a mean absolute percentage error (MAPE) score. The MAPE score is calculated based on the difference between the predicted completion rate and the actual completion rate over a number of time periods in the past. A lower MAPE score represents a better accuracy score. In one embodiment, the set of predictive models are maintained as a library of predictive models. The predictive models are created or learned by a machine-learning engine based on the history data of the predictions. The predictive models may be implemented as a set of predictive functions as executable or binary code images, which may be stored or installed in a persistent storage device and can be loaded into a memory and executed by a processor to perform a corresponding prediction.

According to a particular embodiment, a request is received for determining a task completion rate of each of a first set of tasks associated with a set of task attributes. The first set of tasks are scheduled to be completed within a first time period. An MAPE score is calculated or obtained for each of the completion rate predictive models, which is determined based on prior predictions performed in a second time period in the past. The duration of the second time period is a multiple of the first time period. The set of predictive models include one or more of a conversion-based probability model, a task score aggregation model, a time series model, a neural network model, and a hybrid mode. One of the predictive models is selected based on the MAPE scores of the predictive models, where the selected model has the lowest MAPE score amongst the predictive models in the set. In another embodiment, a predictive model is selected further based on the volatility scores of the predictive models. A model with a combination of lowest MAPE score and volatility score is selected. The selected model is then utilized to predict a number of the tasks in the set that are likely completed within the first time period.

FIG. 1A is a block diagram illustrating a network configuration according to one embodiment of the invention. Referring to FIG. 1A, system 100 includes, but is not limited to, one or more client devices 101-102 communicatively coupled to servers 104-105 over network 103. Clients 101-102 may be any type of clients such as a host or server, a personal computer (e.g., desktops, laptops, and tablets), a "thin" client, a personal digital assistant (PDA), a Web enabled appliance, or a mobile phone (e.g., Smartphone), etc. Network 103 may be any type of networks such as a local area network (LAN), a wide area network (WAN) such as the Internet, or a combination thereof, wired or wireless. Servers 104-105 can be any kinds of servers or a cluster of servers, such as, for example, Web servers, application servers, cloud servers, backend servers, etc.

Task database system 105 provides task management services to a variety of clients, which may be periodically or constantly accessed and updated by the clients for managing their task data or other project management data. The task management services may be provided by a variety of service providers or vendors, such as, for example Salesforce.com, SAP AG, Oracle, and Microsoft.

In one embodiment, data analytics system or sever 104 provides data analytics services to client devices 101-102 based on task data provided by task database system 105 as a data source. Note that although there is only one task database system shown, multiple task database systems may also be implemented. Data analytics system 104 may be implemented as a multi-tenancy system that can access multiple task database systems concurrently. For example, a user of client device 101 may be associated with a first organization as a first corporate client to data analytics system 104, while a user of client device 102 may be associated with a second organization as a second corporate client to data analytics system 104. The first and second organizations may employ the same or different ones of task database systems 105. Also note that a task database system is utilized as an example of data sources, however, other types of data sources or systems can also be applied.

In one embodiment, data analytics system 104 includes, but it is not limited to, user interface 110, forecast engine 120, and data store 130. User interface 110 can be any kind of user interface (e.g., Web, graphical user interface or GUI, or command line interface or CLI) that allows users of client devices 101-102 to access data analytics services provided by data analytics system 104, such as, for example, forecasting or projection services of tasks (also referred as task data) to be performed in various time periods. For example, a user can request a forecast or prediction on a set of specific tasks or opportunities of a specific time period by specifying one or more attributes associated with the tasks. An attribute can be any person or user of an organization, a time period, a processing or workflow stage, an opportunity age, a forecast category, a role of an organization, a geographic region, a project with a certain potential value (e.g., a deal with a certain deal size), or a particular person associated with a task (e.g., a person performing or managing a particular task or tasks), or a combination of any one or more of these attributes, etc.

In response to a request received via user interface 110 from a client, such as clients 101-102, forecast engine 120 determines a period of time (e.g., a current time period) based on the request that the user is interested in for the forecast. The time period can be a current quarter, week, or year that will end in the near future. Forecast engine 120 further determines a set of one or more attributes, which may be received from a user via user interface 110. Forecast engine 120 retrieves task data associated with the time period and the one or more attributes from data store 130.

Data store 130 stores or caches task data of a variety of tasks, which may be periodically updated from the corresponding data source(s) or data provider(s), in this example task database system 105. Alternatively, forecast engine 120 may dynamically access, task database system 105 to query and retrieve the task data. Data stored in data store 130 can be maintained in a variety of data structures, such as tables or databases. Forecast engine 120 can access data store 130 via a variety of application programming interfaces (APIs), database queries, or other suitable communication protocols.

In one embodiment, forecast engine 120 determines one or more past time periods that correspond to the current time period to be forecast. The corresponding past time period would have the same number of days (e.g., business or working days, without weekend or holidays). Forecast engine 120 retrieves task data associated the determined past time periods from data store 130, where the retrieved task data represents one or more tasks that have been performed during the past time periods. Forecast engine 120 calculates a task completion rate of one or more tasks associated with each of the attributes based on the task data of the past time periods. A task completion rate refers to a percentage of the tasks that have been or will be performed and completed during a specific time period. Note that a task can be performed but not completed.

In one embodiment, forecast engine 120 further performs an optimization, such as a smoothing or isotonic regression operation, on the completion rates of the tasks performed in the past time periods. Such an optimization process is to reduce or remove any irregular data or errors. The completion rates of one or more of the past time periods are then applied to the task data of the current time period for forecast purposes. The forecast result represents a probability or percentage of tasks that will be completed or an amount of accomplishment of the tasks recognized (e.g., revenue of a deal to be closed) during the current time period. Since the forecast is performed based on historic statistics of the data of past time periods similar to the current time period by forecast engine 120 as part of machine learning, the accuracy of the forecast is greatly improved.

According to one embodiment, forecast engine 120 is configured to maintain a set of difference machine-learning predictive models, such as a library of models. Each predictive model is configured to predict or determine a probability of a task or tasks to be completed within a predetermined time period (e.g., a current quarter). Different ones of the predictive models may have a difference accuracy under different circumstances such as difference types or categories of tasks. The prior predictions of the models are periodically evaluated. For each of the predictive models, an accuracy score is calculated based on the prior predictions in view of the actual task completion rates of past several time periods (e.g., last quarter, last year). In addition, a volatility score of the predictions between two consecutive time periods is also calculated for each predictive model. The volatility score represents the consistency or trend of the predictions. When a subsequent request is received to determine a completion rate of a current time period, one of the predictive models is selected based on their respective accuracy score and/or volatility score. The selected predictive model is then utilized to predict the completion rate of a task or tasks for the current time period.

In one embodiment, a predictive model having the best accuracy score and/or lowest the volatility score is selected to predict the task completion rate of the current time period. In a particular embodiment, an accuracy score is calculated based on a mean absolute percentage error (MAPE) score. The MAPE score is calculated based on an average of the differences between the predicted completion rate and the actual completion rate over a number of time periods in the past. A lower MAPE score represents a better or higher accuracy score. In one embodiment, the set of predictive models are maintained as a library of predictive models, where each predictive model may be embedded in an executable code image (e.g., a function or subroutine) can be invoked via an application programming interface (API). The predictive models are created or learned by a machine-learning engine based on the history data of the predictions. The predictive models may be implemented as a set of predictive functions such as executable or binary code images, which may be stored or installed in a persistent storage device, loaded into a memory and executed by a processor, and invoked by forecast engine 120 to perform a specific prediction.

Figure 1B:
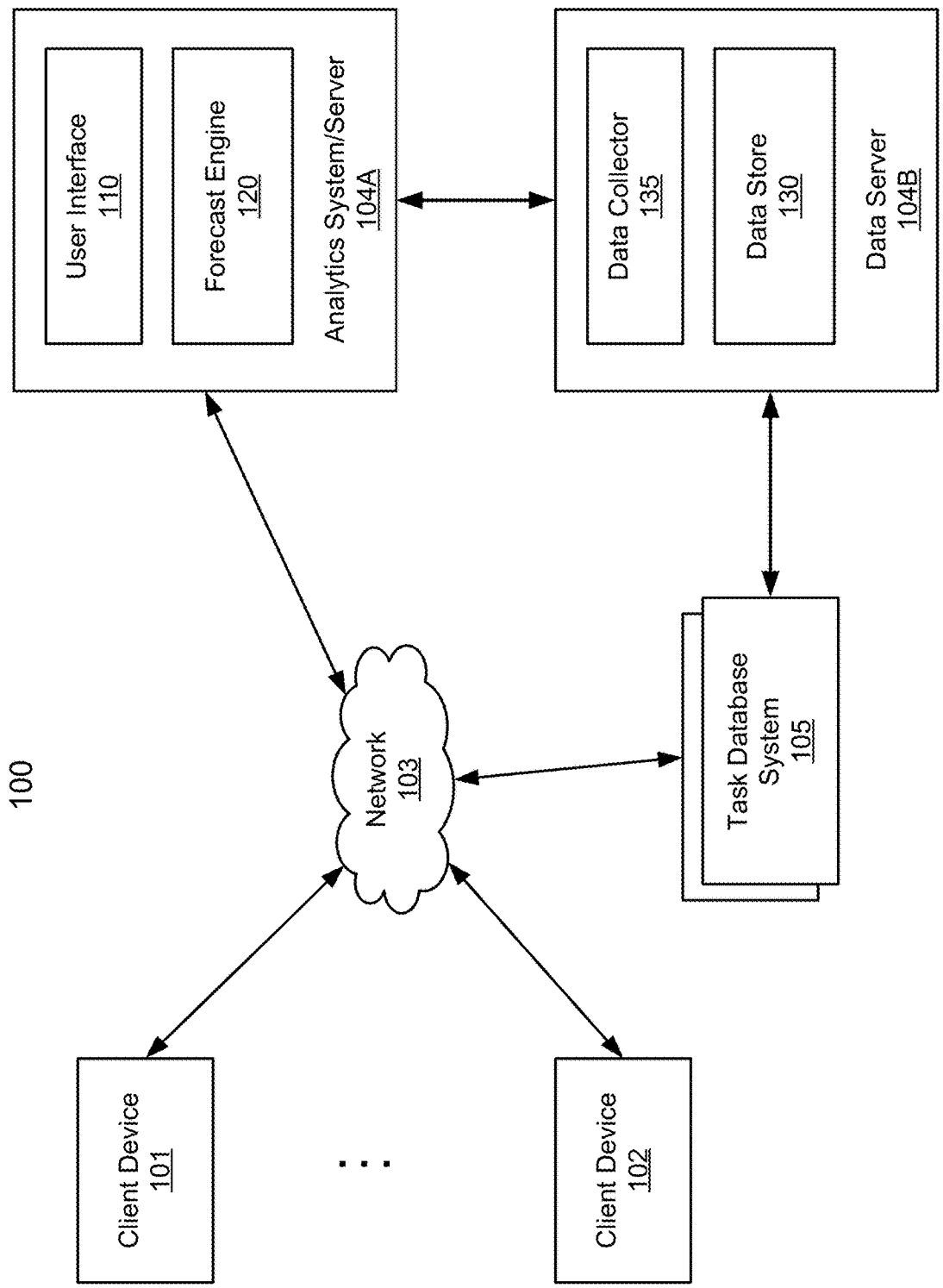

Although in this embodiment, data store 130 is maintained by data analytics system 104, however, data store 130 can be maintained in a dedicated data server that is a separate server from data analytics server 104 as shown in FIG. 1B. Referring now to FIG. 1B, in this embodiment, data analytics server 104A and data server 104B are implemented as separate servers. Data store 130 is now maintained by data server 104B. Data server 104B further includes data collector 135 configured to periodically or constantly collect or update task data from data sources 105. Data analytics server 104A communicates with data server 104B using a variety of communication protocols to access task data stored in data store 130.

Figure 2:
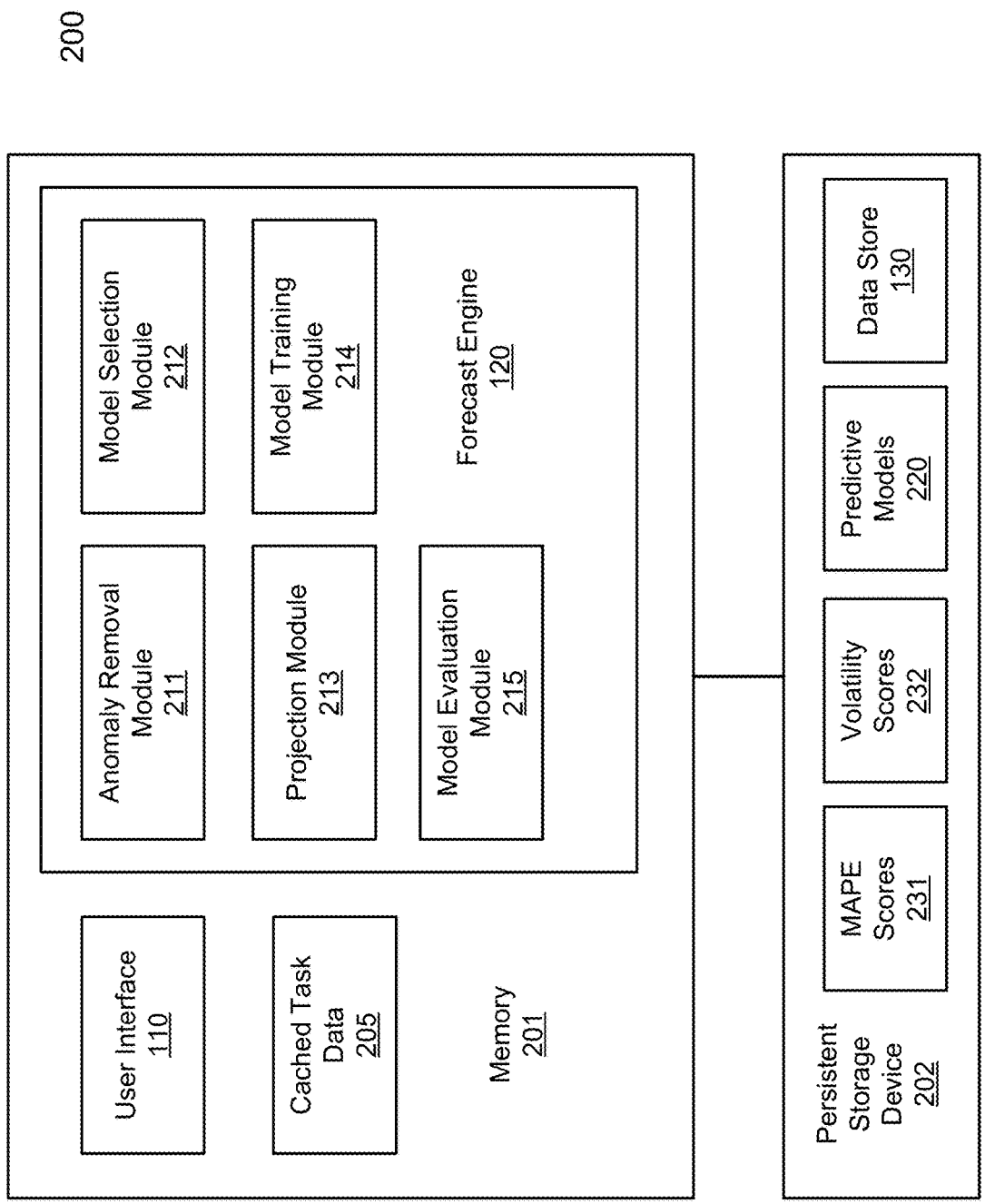
FIG. 2 is a block diagram illustrating an example of a data analytics system according to one embodiment of the invention.
Figure 3:
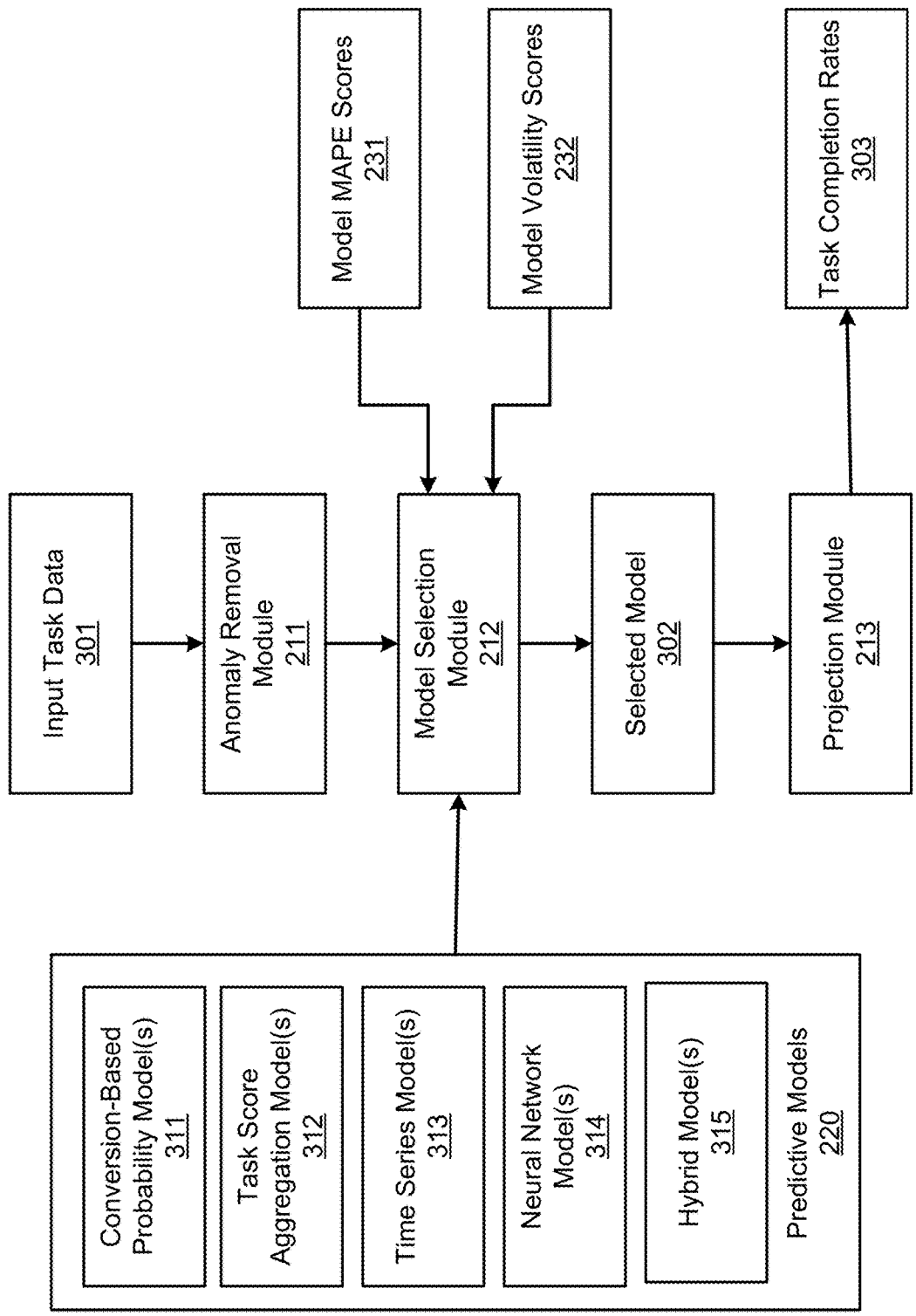
FIG. 3 is a processing flow diagram illustrating a process of predicting task completion according to one embodiment.

FIG. 2 is a block diagram illustrating an example of a data analytics system according to one embodiment of the invention. System 200 may be implemented as part of data analytics system or server 104. FIG. 3 is a processing flow diagram illustrating a prediction process of tasks using predictive models according to one embodiment. Referring to FIGS. 2 and 3, system 200 includes an anomaly detection and removal module 211, a model selection module 212, a projection module 213, a model training module 214, and a model evaluation module 215. According to one embodiment, a request is received via user interface 110, requesting a forecast of a completion of a set of tasks scheduled to be performed during a current time period (e.g., currently quarter ending Sep. 30, 2016). The request may further specify certain attributes associated with the task data and/or the forecast, such as, for example, forecast categories. In response to the request, the task data as requested is retrieved from data store 130 or from task database system 105. Anomaly detection and removal module 211 is configured to analyze the task data to remove any outlier or abnormal data, which may be caused by data entry errors, etc.

Once the task data has been cleaned up, model selection module 212 selects one of the predictive models 220 based on a variety of selection criteria or rules. Given a set of task data, there may be a set of predictive models corresponding to the set of task data. For example, there may be a set of predictive models specifically configured to a particular owner or organization of the task data. In one embodiment, model selection module 212 selects models based on their respective prediction accuracy scores. The accuracy scores are calculated based on the prediction performance in the past. In one embodiment, model selection module 212 selects model 302 from the set of predictive models 220 based on their respective MAPE scores 231 and/or volatility scores 232. A model having the lowest MAPE score and/or the lowest volatility score is selected. Projection module 213 is then configured to project or predict completion rate of the tasks 303 using the selected predictive model.

In one embodiment, predictive models 220 include at least a conversion-based probability model 311, a task score aggregation model 312, a time series model 313, a neural network model 314, and a hybrid mode 315, as shown in FIG. 3. Predictive models are created and trained by model training module 214 and evaluated by model evaluation module 215 based on a set of known task data in the past. Predictive models 220 are created and trained by model training module 214, which may be implemented as a part of a machine-learning engine. The predictions performed by predictive models 220 are evaluated by model evaluation module 215, for example, to calculate the MAPE scores and/or volatility scores for the predictive models.

Tasks for a given time period can include the tasks that are already in the pipeline (e.g., pending tasks) and new tasks that may be added later on within the time period. Thus, the total number of tasks to be completed within a given time period includes: 1) tasks in pipeline $T_{pipeline}$; and 2) new tasks $T_{new}$ that have yet to be added. In one embodiment, each task is associated with a task value or task size representing the value of the task. By predicting the completion rates of the tasks, the total task value of the completed tasks can be determined. Each of the above predictive models have both advantages and disadvantages under different circumstances. A predictive model is good for a particular type of tasks may not be good for another type of tasks. A predictive model is good for the tasks of an organization may not be good for the same types of tasks of another organization. By maintaining a library of difference predictive models and periodic evaluations of the predictive models, a best predictive model can be selected for a given set of tasks.

According to one embodiment, the conversion-based probability model 311 examines the conversion rates of tasks by a selected category (could be forecast, stage or opportunity type) at the same time in previous time period, and calculates the conversion rate to be used for the projection for each category. In other words, if the current day is day 30 of the time period, the model looks at day 30 of the previous time periods to determine how many of the pending tasks at that time were converted to be completed. For the purpose of illustration, a quarter is utilized as an example of a time period.

FIG. 4 is a data structure illustrating an example of task data with different conversion rates according to one embodiment of the invention. Referring to FIG. 4, the table includes a number of rows. Each row corresponding one of the attributes or categories of the tasks, in this example, "closed," "commit," best case," and "pipeline." The goal is to predict the conversion rate (also referred to as a completion rate) of the current time period, current quarter Q. The current time period (Q) column shows the amount currently in pipeline for the quarter broken down by forecast category (e.g., 12 has already been closed and there are 14 in Commit). Q-1, Q-2, Q-3, and Q-4 columns list the status of the pipeline at the same time in the past four quarters respectively, with Q-1 indicating last quarter, Q-2 two quarters ago, Q-3 three quarters ago, and Q-4 same quarter last year. Since the conversion rates of past time periods are known, the model can predict the conversion rates of the current time period based on the conversion rates of the past time periods.

For example, the Q-1 Commit cell shows that at the same time last quarter, there were 12 million dollars in Commit category, of which 9 million dollars were closed by the end of that quarter. Hence, the corresponding conversion rate $C_{commit}^{(1)}=9/12=75\%$. The expected conversion rate used for the current quarter projection is computed as a weighted combination of conversion rates from the same time in past quarters. That is:

$$\underline{C_{category}} = \sum_{i=1}^{4} w_i \cdot C_{category}^{(i)}$$

In this example, for illustration purposes, even weights ($w_i$) are assigned to the past four quarters. In other words, the expected conversion rate is computed as the average of the past conversion rates. Therefore, the expected conversion rate of Closed:

$$\underline{C_{closed}} = \frac{1}{4}\sum_{i=1}^{4} C_{closed}^{(i)} = (100\% + 100\% + 100\% + 100\%)/4 = 100\%$$

The expected conversion rate of Commit:

$$\underline{C_{commit}} = \frac{1}{4}\sum_{i=1}^{4} C_{comit}^{(i)} = (75\% + 80\% + 70\% + 60\%)/4 = 71.25\%$$

The expected conversion rate of Best Case:

$$\underline{C_{bestcase}} = \frac{1}{4}\sum_{i=1}^{4} C_{bestcase}^{(i)} = (60\% + 50\% + 50\% + 62.5\%)/4 = 55.63\%$$

The expected conversion rate of Pipeline:

$$\underline{C_{pipeline}} = \frac{1}{4}\sum_{i=1}^{4} C_{pipeline}^{(i)} = (20\% + 24\% + 11.1\% + 31.3\%)/4 = 21.6\%$$

The expected task values for existing pipeline this quarter can be computed as:

$$r_{pipeline} = X_{closed}^{(0)} \times \underline{C_{closed}} + X_{commit}^{(0)} \times \underline{C_{commit}} +$$
$$X_{bestcase}^{(0)} \times \underline{C_{bestcase}} + X_{pipeline}^{(0)} \times \underline{C_{pipeline}}$$
$$r_{pipeline} = 12 \times 100\% + 14 \times 71.25\% + 6 \times 55.62\% + 14 \times 21.6\% = 28.34$$

Further information concerning the conversion-based probability model can be found in details in the above incorporated-by-reference patent application.

The task score aggregation model 312 is configured to examine each task individually and predict the probability of completion of the task. This model or method leverages machine learning to examine all relevant fields, attributes, metadata, and historical change patterns of a task, and predicts how likely a task is to close by a certain date.

Compared with the conversion-based probability model 311, task score aggregation model 312 takes into account more factors beyond just certain fields like stage and forecast category. For instance, a large-sized task naturally takes longer to complete due to its complexity, and thus requires much more effort from the team, which can be reflected by the task score. In comparison, the conversion based method treats all tasks the same way.

In order to calculate a task score, binary classification algorithms, such as a logistic regression algorithm, a gradient boosted decision trees (GBDT) algorithm, and/or a long short term memory (LSTM) algorithm are utilized. The features of the data are the fields (or attributes, metadata) information extracted at a particular time (e.g., snapshot). It contains information such as forecast category, stage name, size, time since creation, remaining time to the end of the time period, task type, etc.

The model is trained based on a set of known tasks that have been completed or not completed in the past like two years to assign a task score to each task. A task score is an indication of how likely the task is to be completed given the history and properties (fields, attributes, metadata) of the task. It is a direct reflection of the probability of a task completed given its current state and the complete set of states that it has been in the past. At both extremes, the completed tasks are given a task score of 100 while failed or lost tasks are given a task score of zero. If an active task is given a task score of 89, the task has an 89% chance of completeness. For example, if a task is in a later one of the processing stages, the task has a higher probability of completeness. The model also examines the transitions of the task between different stages to determine the probability of completeness. For example, in some situations, even though a task is in a late stage, however, it was in an even later state before. The fact that the task transition backwardly indicates that there may be some issues of the task, which will have a lower task score.

As described above, the number of tasks to be completed within a given time period can include two portions: 1) the tasks that have been pending in the pipeline (e.g., already initiated but not completed) and 2) possible new tasks that will be started later on and scheduled to be completed by the end of the timer period. The total number of tasks to be completed represents the sum of these two portions. Thus, dependent upon the current day within the time period, there could be a significant portion of the tasks that are new tasks or vice versa. For example, if today is near the beginning of the time period, the potential amount of new tasks could be much larger than the amount of tasks in the pipeline. On the other hand, if today is near the end of the time period, the number of tasks in the pipeline should be much larger than the potential new tasks. The conversion-based probability model 311 and the task score aggregation model 312 described above are designed to examine the task data in the pipeline to predict how many of those tasks in the pipeline will be completed by the end of the time period.

In order to predict the potential new tasks to be completed by the end of the time period, another approach is utilized in conjunction with the conversion-based probability model and the task score aggregation model. According to one embodiment, a ratio-based estimation method is utilized to estimate an amount of new tasks that will be commenced during the time period and also be scheduled to complete by the end of the time period.

Typically, the new tasks contributing to the total of completed tasks or task values, also referred to as the end-of-quarter (EOQ) completed tasks or task values, typically follow a similar monotonic decreasing pattern. Thus, based on the expected task value or revenue from pipelines $r_{pipeline}$, we can estimate $r_{new}$ proportionally. One such method is to compute a new-ratio:

newRatio=$r_{new}/r_{pipeline}$

Total end of quarter task value $r_{eoq}$, is computed as:

$$r_{eoq} = r_{pipeline} + r_{new} = r_{pipeline} + r_{pipeline} * newRatio = r_{pipeline} * (1 + newRatio)$$

As shown in FIG. 4, the end-of-quarter task value for Q-1 was 75, with 25 (=10+9+3+3) coming from existing pipelines, and 50 from new opportunities. Hence:

newRatio$^{(1)}$=$r_{new}^{(1)}/r_{pipeline}^{(1)}$=50/25=2.00      Q-1:

newRatio$^{(2)}$=$r_{new}^{(2)}/r_{pipeline}^{(2)}$=52/28=1.86      Q-2:

newRatio$^{(3)}$=$r_{new}^{(3)}/r_{pipeline}^{(3)}$=51/24=2.13      Q-3:

newRatio$^{(4)}$=$r_{new}^{(4)}/r_{pipeline}^{(4)}$=37/33=1.12      Q-4:

In order to estimate the total task value from new tasks, a weighted combination of past new ratios is used the same way this is done for existing pipeline:

$$\underline{newRatio} = \sum_{i=1}^{4} w_i \cdot newRatio^{(i)}$$

For illustration purpose, even weights ($w_i$) are utilized for each of the past four quarters. Thus, the expected new ratio would be computed as such:

$$\underline{newRatio} = \frac{1}{4}\sum_{i=1}^{4} newRatio^{(i)} = (2.00+1.86+2.13+1.12)/4 = 1.78$$

Suppose we have already computed the task values from existing pipeline this quarter $r_{pipeline}$ to be 28.34, then the task value from new tasks is simply $r_{new}$=28.34×1.78=50.45, and $r_{total}$=$r_{pipeline}$+$r_{new}$=28.34+50.45=78.79.

According to one embodiment, time series model 313 focuses mainly on patterns, pattern changes and disturbances caused by random influences. Time series analysis comprises methods for analyzing time series data in order to extract meaningful statistics and other characteristics of the data. Time series forecasting is the use of a model to predict future values based on previously observed values. In one embodiment, time series model 313 includes a seasonal autoregressive integrated moving average (ARIMA) model, a linear regression model, or an exponential regression model.

In statistics and in particular in time series analysis, an ARIMA model is a generalization of an autoregressive moving average (ARMA) model. Both of these models are fitted to time series data either to better understand the data or to predict future points in the series (forecasting). ARIMA models are applied in some cases where data show evidence of non-stationarity, where an initial differencing step (corresponding to the "integrated" part of the model) can be applied one or more times to eliminate the non-stationarity.

In one embodiment, a linear regression model can be defined as y=ax+b. An exponential regression model can be defined as y=ab$^x$, where coefficient (a) is a non-zero value. These regression models can be utilized to predict the potential new tasks that can be added within a time period. The linear/exponential regression models can be utilized in combination with any of the pipeline-based models described above, such as, for example, conversion-based probability model 311 and task score aggregation model 312 to generate a final forecast that covers both the pipeline task forecast and new task forecast.

In one embodiment, neural network model 314 leverages artificial intelligence (AI) and machine learning techniques to go beyond a simple ratio to estimate task completion rates from new tasks. The model leverage task histories to construct training data. For each day of past quarters, at least one training example is constructed. The target of each training example is the task value from newly created tasks from the select time point until the end of corresponding quarter. Meanwhile, the following features are included: number of days left until the end of the time period, number of business days left until the end of the time period, pipeline status including total amount of tasks in each stage or forecast category, new tasks created since the beginning of the time period, and the new task value at the same time in past quarters.

The remaining time in the quarter, specifically the number of business days, is one of the most important factors in determining how much task value or revenue can be generated from newly created opportunities. The probability of a newly created task coming in and closing decreases as the quarter progresses (note that this does not necessarily apply to tasks which appear to be created because they were not in the task database system, but are in fact currently being worked on).

In model 313, three different regressors are used: linear regression with proper regularization like least absolute shrinkage and selection operator (LASSO) or Ridge Regression, nonlinear models like feedforward neural network, and deep learning sequence modeling by long short term memory (LSTM) networks, which is one embodiment of recurrent neural network (RNN), to capture the dynamics of time series.

Hybrid model 315 combines a regression model with other pipeline-based models in the following way, according to one embodiment:

$$r_{eoq\text{-}hybrid}(t)=\beta(t) \cdot r_{eoq\text{-}regression}(t)+(1-\beta(t)) \cdot r_{eoq\text{-}pipeline}(t)$$

where $r_{eoq\text{-}regression}(t)$ is the predicted revenue based on an end-of-quarter regression model, and $r_{eoq\text{-}pipeline}(t)$ is any pipeline-based projection model on day t in the quarter. The pipeline-based projection model can be a conversion-based probability model 311 or a task score aggregation model 312 as described above. The regression model can be a linear regression model, an exponential regression model, or an ARIMA model. $\beta(t)$ is a monotonically decreasing function with respect to time t. $\beta(0)$=1, and $\beta(t)$=0 when t is the last day of quarter. Essentially, it uses the weighted sum of the forecasts calculated from different methods as the final prediction, to leverage their advantages in a single model. The weights are determined based on the time period in the quarter. From a Bayesian perspective, the trend projection is leveraged as a prior for the projection, but it will self-correct as more and more pipeline data is accumulated as the quarter progresses.

As described above, there are several projection methods available for both the current pipeline revenue projection and the new revenue projection. Different organizations tend to exhibit different patterns and behaviors. It is unlikely that one particular method would work universally across different teams and/or organizations. Therefore, each method is re-evaluated periodically, e.g., on a quarterly basis, for every organization in order to select the best method for that particular organization. In order to quantify the model performance, we select historical time periods as test time periods, and for each of the test time periods, we take a predetermined numbers of time periods (e.g., four time periods) preceding it as training time periods. For the purpose of illustration, a quarter is utilized as a time period herein.

Figure 5:
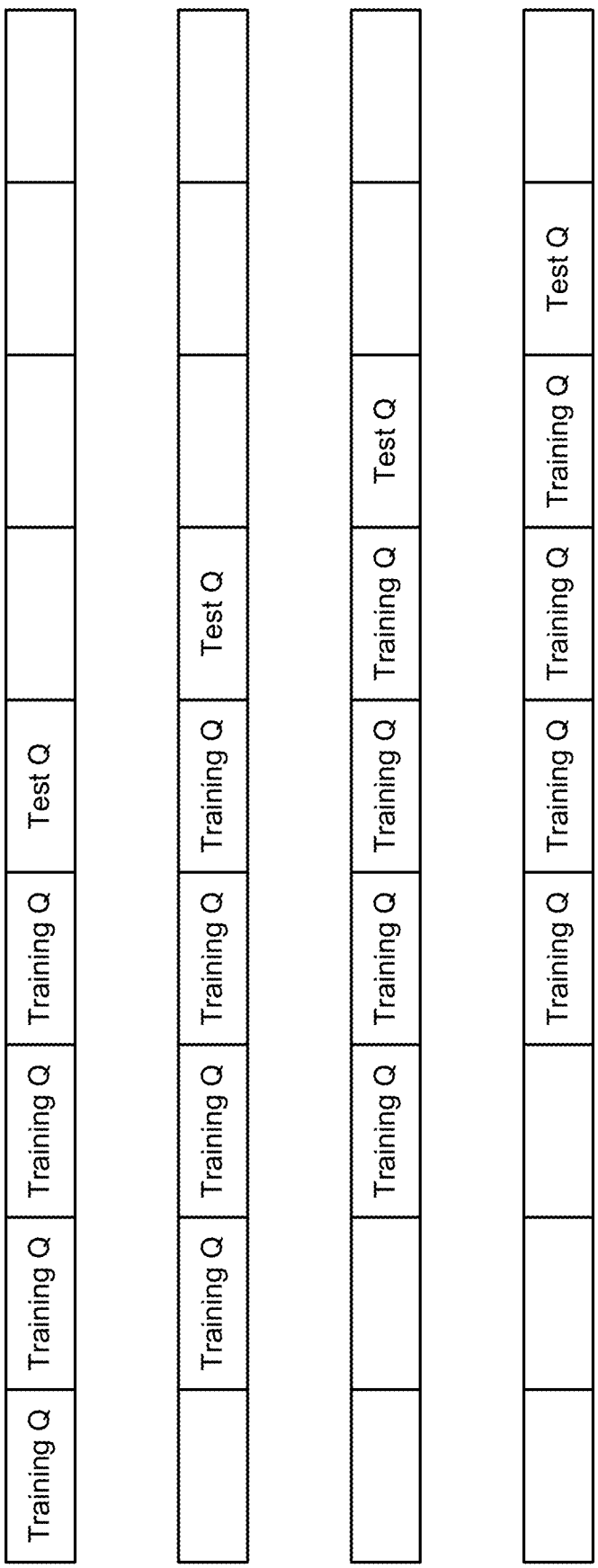
FIG. 5 is a block diagram illustrating a process of evaluating models according to one embodiment.

FIG. 5 is a block diagram illustrating an example of model selection scheme according to one embodiment. Referring to FIG. 5, in order to quantify the model performance, in one embodiment, we select historical quarters as test quarters, and for each of the test quarters, we take the four quarters preceding it as training quarters. For each day in the test quarter, we compute the projection and compare it with the end-of-quarter task value for that quarter. To measure the accuracy of the projection at a particular date, we calculate the corresponding absolute percentage error (APE) score for the projection performed on a particular day during the test quarter. In one embodiment, the APE score is defined as follows:

$$APE = \frac{|Projection - EOQ|}{EOQ},$$

As shown above, the APE score is determined based on a difference between a projection and the actual task value (EOQ) within the corresponding time period. The mean absolute percentage error (MAPE) score is used to measure the overall historical projection accuracy of the test quarter. In one embodiment, a definition for MAPE is presented below where $D^{(i)}$ is the number of days within the (i)-th quarter as follows:

$$MAPE^{(i)} = \frac{1}{D^{(i)}} \sum_{j=1}^{D^{(i)}} \frac{|Projection_j^{(i)} - r_{eoq}^{(i)}|}{r_{eoq}^{(i)}}.$$

For the model selection, we can go back one year and evaluate the model where each of the last four quarters are designated as the test quarters. Finally, according to one embodiment, the MAPE score is computed over four quarters as follows:

$$MAPE = \frac{1}{4} \sum_{k=1}^{4} \frac{1}{D^{(i)}} \sum_{j=1}^{D^{(i)}} \frac{|Projection_j^{(i)} - r_{eoq}^{(i)}|}{r_{eoq}^{(i)}}.$$

In one embodiment, a model with the least or minimum MAPE score amongst the model candidates will be selected to perform the prediction.

According to another embodiment, in addition to the error metric, we also examine volatility of the projection. We expect the projection to progress in a stable way day over day and only fluctuate dramatically if there are major changes to the pipeline. In one embodiment, a volatility score of the projection is defined as follows:

$$volatility^{(i)} = \frac{1}{D^{(i)} - 1} \sum_{j=2}^{D^{(i)}} \frac{|Projection_j^{(i)} - Projection_{j-1}^{(i)}|}{r_{eoq}^{(i)}}$$

In essence, we examine the daily projection difference relative to the prior day, normalized by the actual end-of-quarter revenue. Models with the volatility scores less than a predetermined threshold (e.g., 3% volatility) may be selected. In one embodiment, in selecting the best model, the models are evaluated based on their respective volatility scores. A set of model candidates are selected from the models whose volatility scores are below a predetermined threshold (e.g., 3%). From the set of model candidates, a model with the minimum MAPE score is selected as the final model candidate for projection. Note that the volatility scores and MAPE scores of the models may be periodically calculated and the best model may be selected based on the volatility scores and/or the MAPE scores, prior to receiving request for forecasting the task completion rates. The information concerning the selected best model, as well as the MAPE and volatility scores, may be stored in a persistent storage device, which can be accessible by forecast engine 120 at real-time in response to a new request.

Figure 6:
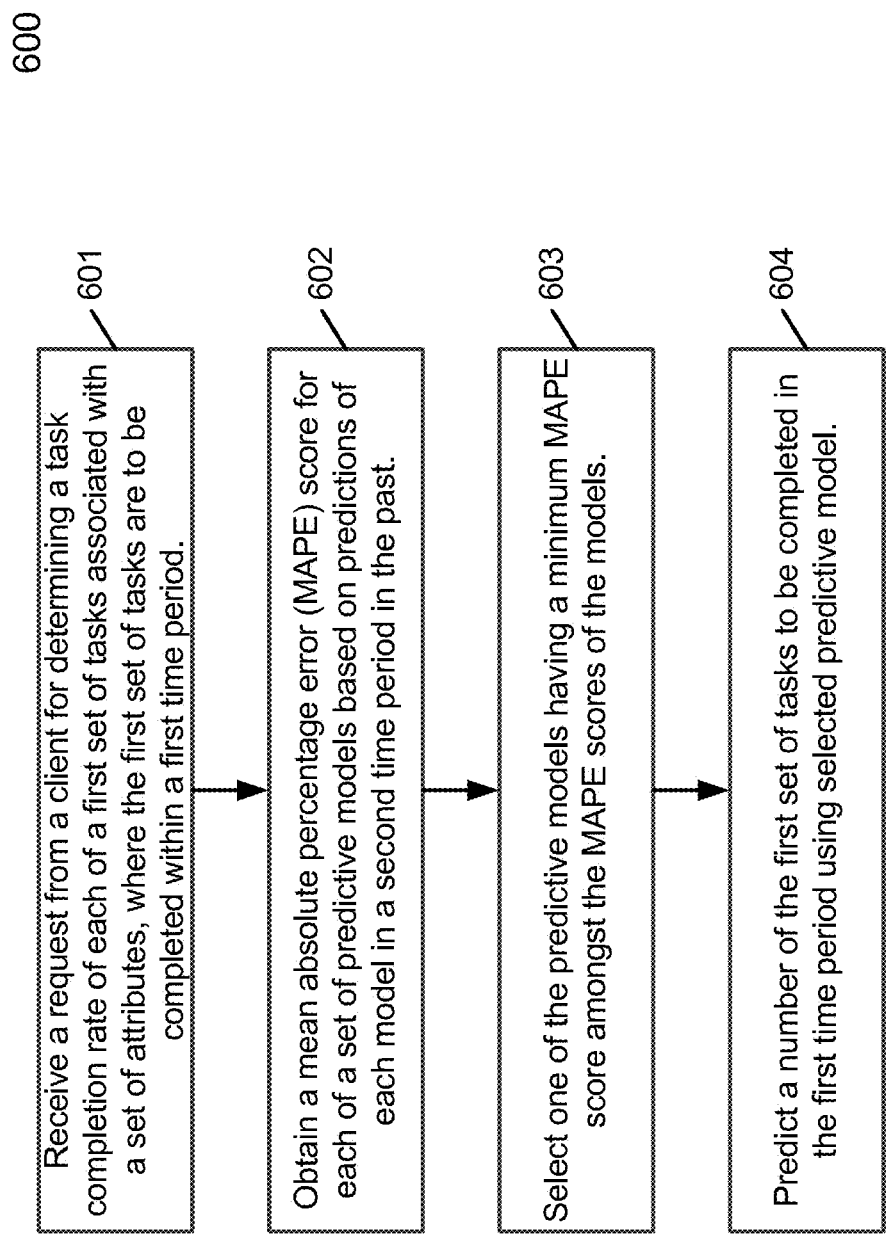
FIG. 6 is a flow diagram illustrating a process of predicting task completion using predictive models according one embodiment.

FIG. 6 is a flow diagram illustrating a process of predicting task completeness of tasks according to one embodiment. Process 600 may be performed by processing logic which may include software, hardware, or a combination thereof. For example, process 600 may be performed by forecast engine 120 of FIG. 2. Referring to FIG. 6, in operation 601, a request is received from a client for determining a task completion rate of each of first set of tasks associated with a set of attributes (e.g., forecast categories). The first set of tasks are to be completed within a first time period. In operation 602, an MAPE score is obtained for each of a set of predictive models based on predictions of each model performed in a second time period in the past. The predictive models include one or more of a conversion-based probability model, a task score aggregation model, a time series model, a neural network model, and a hybrid model. In operation 603, one of the predictive models is selected based on the MAPE scores of the models. The selected model has a minimum MAPE score amongst the models. In operation 604, the selected model is utilized to predict a number of tasks in the first set that will likely be completed within the first time period.

Figure 7:
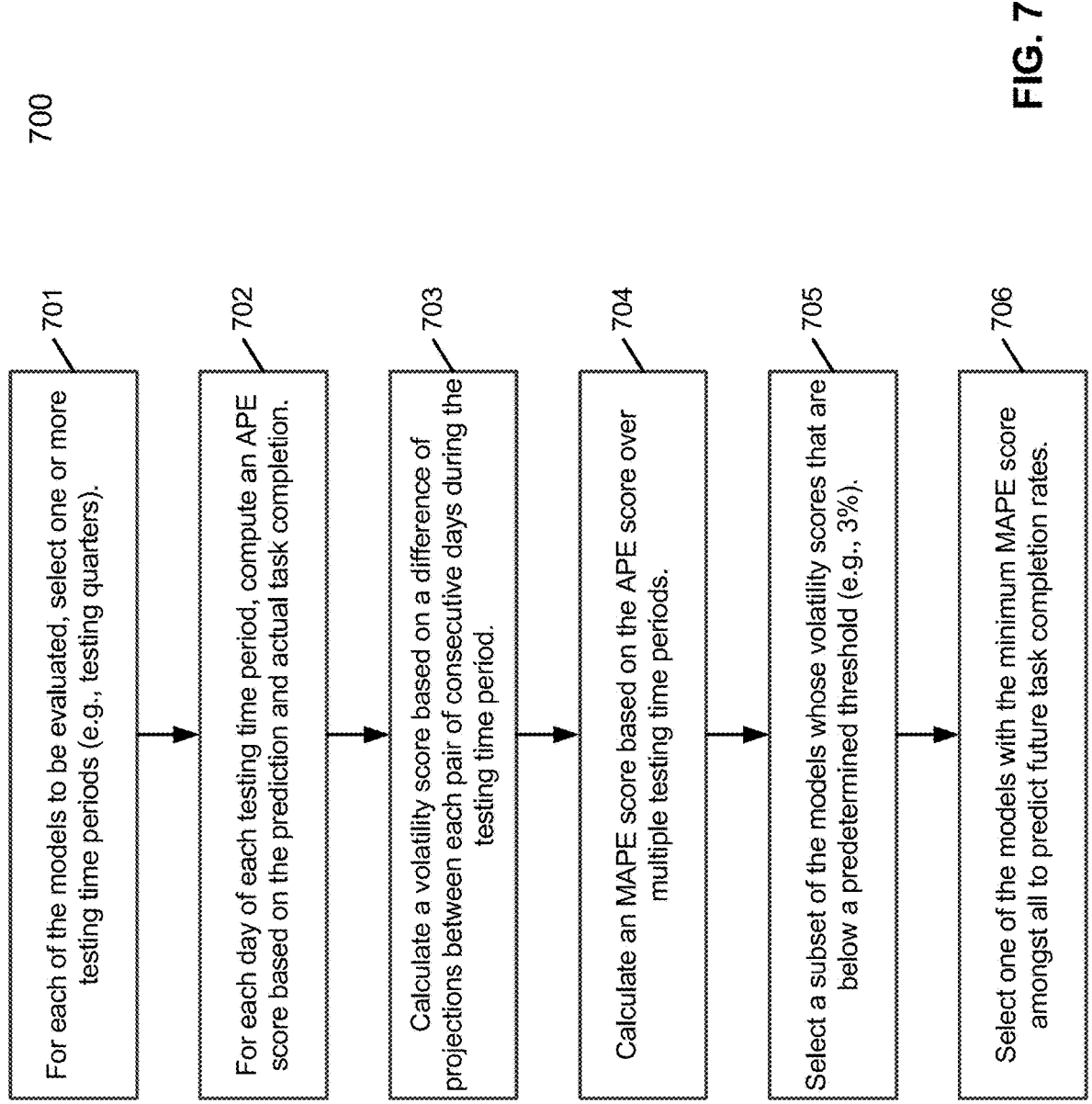
FIG. 7 is a flow diagram illustrating a process of evaluating and selecting predictive models according to one embodiment.

FIG. 7 is a flow diagram illustrating a process of selecting a model for predicting task completeness of tasks according to one embodiment. Process 700 may be performed by processing logic which may include software, hardware, or a combination thereof. For example, process 700 may be performed by forecast engine 120 of FIG. 2. Referring to FIG. 7, in operation 701, for each of the predictive models, one or more test time periods (e.g., test quarters) are selected. In operation 702, for each day of the test time periods, processing logic computes an APE score based on the task completion projection and the actual task completion. In operation 703, processing logic calculates a volatility score based on a difference of projections between each pair of adjacent days during the test time period. In operation 704, processing logic calculate an MAPE score based on the APE scores over multiple test time periods. In operation 705, a subset of predictive models are selected whose volatility scores are below a predetermined threshold. In operation 706, a final predictive model is selected from the subset of models with the minimum MAPE score amongst all the models.

The techniques described throughout this application can be applied to a variety of scenarios. The term of "task" refers to any task performed or to be performed in a current time period or a past time period. A task can be a project (e.g., a software development project) performed or to be performed over a period of time. A task can be a sales contact or opportunity or deal negotiated or to be negotiated (e.g., closed). Similarly, a task value or task size refers to the revenue associated with a sales deal or opportunity. Further, task database system 105 may be a customer relationship management (CRM) system. CRM is a term that refers to practices, strategies and technologies that companies use to manage and analyze customer interactions and data throughout the customer lifecycle, with the goal of improving relationships with their clients or customers, assisting in customer retention and driving growth. CRM systems are designed to compile information on customers across different channels or points of contact between the customer and the company, which could include the company's website, telephone, live chat, direct mail, marketing materials and social media.

Note that some or all of the components as shown and described above (e.g., forecast engine 120 of FIGS. 1A-1B and 2) may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Figure 8:
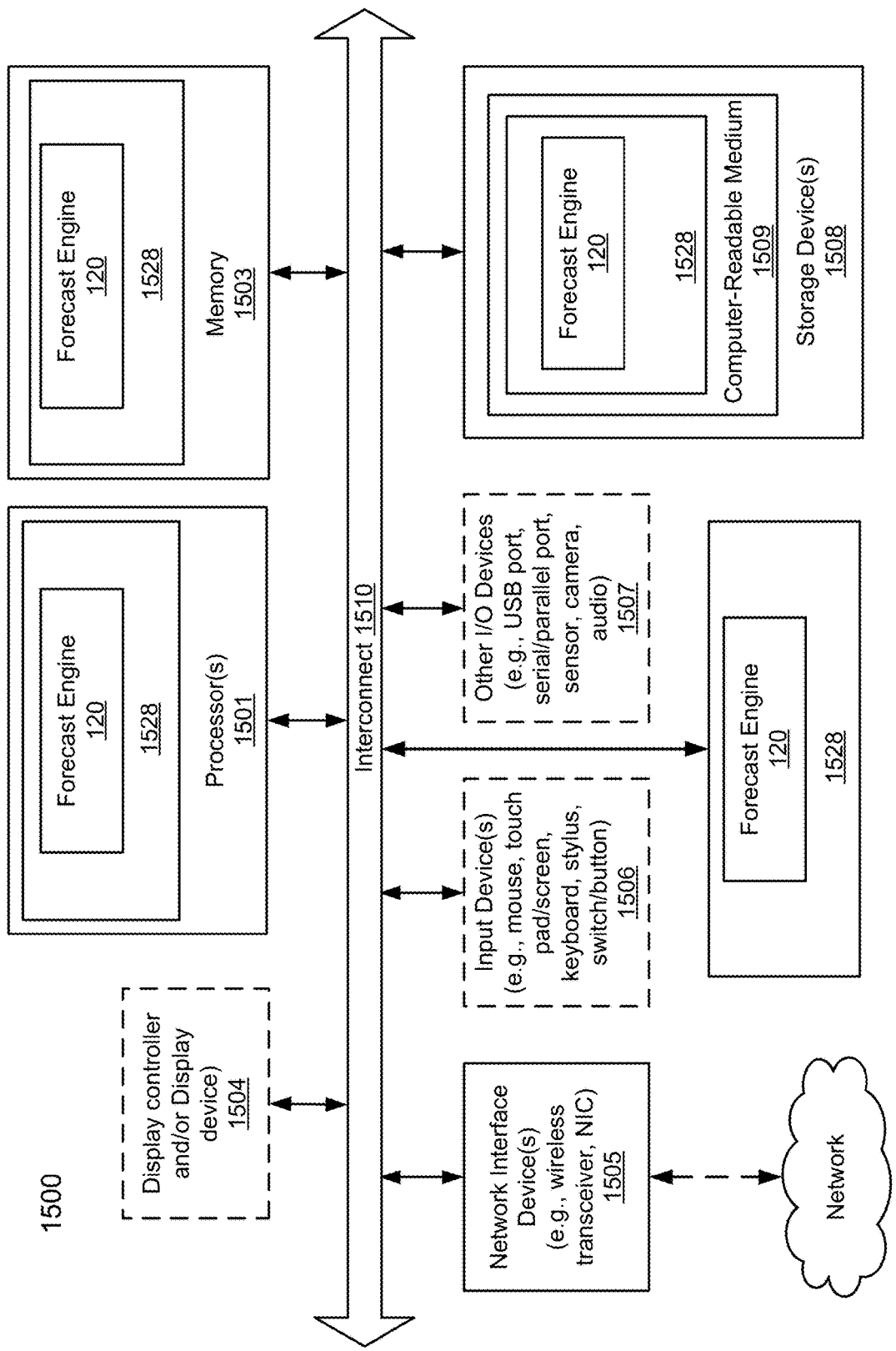
FIG. 8 is a block diagram illustrating a data processing system according to one embodiment.

FIG. 8 is a block diagram illustrating an example of a data processing system which may be used with one embodiment of the invention. For example, system 1500 may represent any of data processing systems described above performing any of the processes or methods described above, such as, for example, client devices 101-102 and servers 104-105 of FIG. 1. System 1500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 1500 is intended to show a high level view of many components of the computer system. However, it is to be understood that additional components may be present in certain implementations and furthermore, different arrangement of the components shown may occur in other implementations. System 1500 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1500 includes processor 1501, memory 1503, and devices 1505-1508 via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 1501, which may be a low power multi-core processor socket such as an ultra-low voltage processor, may act as a main processing unit and central hub for communication with the various components of the system. Such processor can be implemented as a system on chip (SoC). Processor 1501 is configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices. Memory 1503 may store information including sequences of instructions that are executed by processor 1501, or any other device. For example, executable code and/or data of a variety of operating systems, device drivers, firmware (e.g., input output basic system or BIOS), and/or applications can be loaded in memory 1503 and executed by processor 1501. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 1500 may further include 10 devices such as devices 1505-1508, including network interface device(s) 1505, optional input device(s) 1506, and other optional 10 device(s) 1507. Network interface device 1505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1507 may include an audio device. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

To provide for persistent storage of information such as data, applications, one or more operating systems and so forth, a mass storage (not shown) may also couple to processor 1501. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1501, e.g., via a serial peripheral interface (SPI). This flash device may provide for non-volatile storage of system software, including a basic input/output software (BIOS) as well as other firmware of the system.

Storage device 1508 may include computer-accessible storage medium 1509 (also known as a machine-readable storage medium or a computer-readable medium) on which is stored one or more sets of instructions or software (e.g., module, unit, and/or logic 1528) embodying any one or more of the methodologies or functions described herein. Processing module/unit/logic 1528 may represent any of the components described above, such as, for example, forecast engine 120. Module/unit/logic 1528 may also reside, completely or at least partially, within memory 1503 and/or within processor 1501 during execution thereof by data processing system 1500, memory 1503 and processor 1501 also constituting machine-accessible storage media. Module/unit/logic 1528 may further be transmitted or received over a network via network interface device 1505.

Computer-readable storage medium 1509 may also be used to store some software functionalities described above persistently. While computer-readable storage medium 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media, or any other non-transitory machine-readable medium.

Module/unit/logic 1528, components and other features described herein can be implemented as discrete hardware components or integrated in the functionality of hardware components such as ASICS, FPGAs, DSPs or similar devices. In addition, module/unit/logic 1528 can be implemented as firmware or functional circuitry within hardware devices. Further, module/unit/logic 1528 can be implemented in any combination hardware devices and software components.

Note that while system 1500 is illustrated with various components of a data processing system, it is not intended to represent any particular architecture or manner of interconnecting the components; as such details are not germane to embodiments of the present invention. It will also be appreciated that network computers, handheld computers, mobile phones, servers, and/or other data processing systems which have fewer components or perhaps more components may also be used with embodiments of the invention.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method for predicting task completion of a plurality of tasks, the method comprising:
receiving, at a machine-learning based system, a request from a client for determining a task completion rate of a first set of a plurality of tasks, wherein each of the first set of tasks is associated with one or more of a plurality of attributes and is scheduled to be performed within a first time period, wherein the machine-learning based system maintains a set of predictive models and periodically evaluates each of the set of predictive models based on a set of known tasks in the past to calculate a mean absolute percentage error (MAPE) score and a volatility score for each of a set of predictive models based on predictions of each model in a second time period in the past, wherein the predictive models comprise one or more of a conversion-based probability model, task score aggregation model, a time series model, a neural network model, and a hybrid model;
responsive to the request from the client, obtaining the MAPE score and the volatility score for each of the set of predictive models;
selecting, from the set of predictive models, one or more predictive models, each selected predictive model having a volatility score below a predetermined threshold, wherein the volatility score measures prediction fluctuations day over day;
determining, from the one or more selected predictive models, one predictive model that has a minimum MAPE score;
predicting a number of the first set of tasks to be completed in the first time period using determined predictive model; and
iteratively, for a predetermined number of iterations, performing the operations of receiving a request, obtaining the MAPE score and the volatility score, selecting, one or more predictive models, determining one predictive model that has a minimum MAPE score, and predicting a number of the first set of tasks to be completed;
wherein, for each iteration of the predetermined number of iterations, a new set of tasks are used as the first set of tasks, and the completion rate of the first set of tasks for the preceding iteration in the first time period is merged with the set of known tasks and are used to calculate the MAPE score and the volatility score for a next iteration.

2. The method of claim 1, wherein the MAPE score of a predictive model is determined based on a difference between a predicted number of tasks to be completed during the second period of time and an actual number of tasks that actually have been completed within the second period of time.

3. The method of claim 2, wherein the difference between the predicted number of completed tasks and actual number of completed tasks is calculated for a plurality of third time periods collectively constituting the second time period, and wherein the MAPE score is calculated based on the differences of the third time periods.

4. The method of claim 3, further comprising calculating a volatility score for each of the models based on the differences between the predicted and actual number of completed tasks between each pair of adjacent third time periods.

5. The method of claim 1, wherein the conversion-based probability model is to determine a probability of a set of tasks that have been initiated during the first period of time in view of a completion rate of tasks at the same time of the second time period.

6. The method of claim 1, wherein the task score aggregation model is to assign a task score for each task based on a plurality of attributes of the task, the task score representing a probability of the task that can be completed within the first time period.

7. The method of claim 6, wherein the task score is determined based on a stage of the task and a number of day remained until an end of the first time period, wherein each task goes through a plurality of stages before being completed.

8. The method of claim 1, wherein the neural network model is to predict a completion rate of tasks based on a plurality of attributes associated with the tasks including a number of days remained until an end of the first time period, a number of tasks in each of a plurality of stages, a number of new tasks created since starting of the first time period.

9. The method of claim 1, wherein the hybrid model is to predict a completion rate of a task using a weighted combination of a regression model and the conversion-based probability model or a weighted combination of the regression model the task score aggregation model.

10. The method of claim 9, wherein the regression model comprises one of a linear regression model, an exponential regression algorithm, and an autoregressive integrated moving average (ARIMA) algorithm.

11. A non-transitory machine-readable medium having instructions stored therein, which when executed by a processor, cause the processor to perform operations of predicting task completion of a plurality of tasks, the operations comprising:
receiving, at a machine-learning based system, a request from a client for determining a task completion rate of a first set of a plurality of tasks, wherein each of the first set of tasks is associated with one or more of a plurality of attributes and is scheduled to be performed within a first time period, wherein the machine-learning based system maintains a set of predictive models and periodically evaluates each of the set of predictive models based on a set of known tasks in the past to calculate a mean absolute percentage error (MAPE) score and a volatility score for each of a set of predictive models based on predictions of each model in a second time period in the past, wherein the predictive models comprise one or more of a conversion-based probability model, task score aggregation model, a time series model, a neural network model, and a hybrid model;

responsive to the request from the client, obtaining the MAPE score and the volatility score for each of the set of predictive models;

selecting, from the set of predictive models, one or more predictive models, each selected predictive model having a volatility score below a predetermined threshold, wherein the volatility score measures prediction fluctuations day over day;

determining from the one or more selected predictive models, one predictive model that has a minimum MAPE score;

predicting a number of the first set of tasks to be completed in the first time period using the determined predictive model; and iteratively, for a predetermined number of iterations, performing the operations of receiving a request, obtaining the MAPE score and the volatility score, selecting, one or more predictive models, determining one predictive model that has a minimum MAPE score, and predicting a number of the first set of tasks;

wherein, for each iteration of the predetermined number of iterations, a new set of tasks are used as the first set of tasks and the completion rate of the first set of tasks for the preceding iteration in the first time period is merged with the set of known tasks and are used to calculate the MAPE score and the volatility score for a next iteration.

12. The machine-readable medium of claim 11, wherein the MAPE score of a predictive model is determined based on a difference between a predicted number of tasks to be completed during the second period of time and an actual number of tasks that actually have been completed within the second period of time.

13. The machine-readable medium of claim 12, wherein the difference between the predicted number of completed tasks and actual number of completed tasks is calculated for a plurality of third time periods collectively constituting the second time period, and wherein the MAPE score is calculated based on the differences of the third time periods.

14. The machine-readable medium of claim 13, wherein the operations further comprise calculating a volatility score for each of the models based on the differences between the predicted and actual number of completed tasks between each pair of adjacent third time periods.

15. The machine-readable medium of claim 11, wherein the conversion-based probability model is to determine a probability of a set of tasks that have been initiated during the first period of time in view of a completion rate of tasks at the same time of the second time period.

16. The machine-readable medium of claim 11, wherein the task score aggregation model is to assign a task score for each task based on a plurality of attributes of the task, the task score representing a probability of the task that can be completed within the first time period.

17. The machine-readable medium of claim 16, wherein the task score is determined based on a stage of the task and a number of day remained until an end of the first time period, wherein each task goes through a plurality of stages before being completed.

18. The machine-readable medium of claim 11, wherein the neural network model is to predict a completion rate of tasks based on a plurality of attributes associated with the tasks including a number of days remained until an end of the first time period, a number of tasks in each of a plurality of stages, a number of new tasks created since starting of the first time period.

19. The machine-readable medium of claim 11, wherein the hybrid model is to predict a completion rate of a task using a weighted combination of a regression model and the conversion-based probability model or a weighted combination of the regression model the task score aggregation model.

20. The machine-readable medium of claim 19, wherein the regression model comprises one of a linear regression model, an exponential regression algorithm, and an autoregressive integrated moving average (ARIMA) algorithm.

21. A data processing system, comprising:
a processor; and
a memory coupled to the processor to store instructions, which when executed by the processor, cause the processor to perform operations of predicting task completion of a plurality of tasks, the operations including
receiving, at a machine-learning based system, a request from a client for determining a task completion rate of a first set of a plurality of tasks, wherein each of the first set of tasks is associated with one or more of a plurality of attributes and is scheduled to be performed within a first time period, wherein the machine-learning based system maintains a set of predictive models and periodically evaluates each of the set of predictive models based on a set of known tasks in the past to calculate a mean absolute percentage error (MAPE) score and a volatility score for each of a set of predictive models based on predictions of each model in a second time period in the past, wherein the predictive models comprise one or more of a conversion-based probability model, task score aggregation model, a time series model, a neural network model, and a hybrid model, responsive to the request from the client, obtaining the MAPE score and the volatility score for each of the set of predictive models;

selecting, from the set of predictive models, one or more predictive models, each selected predictive model having a volatility score below a predetermined threshold, wherein the volatility score measures prediction fluctuations day over day, determining, from the one or more selected predictive models, one predictive model that has a minimum MAPE score, and predicting a number of the first set of tasks to be completed in the first time period using the determined predictive model, and iteratively, for a predetermined number of iterations, performing the operations of receiving a request, obtaining the MAPE score and the volatility score, selecting, one or more predictive models, determining one predictive model that has a minimum MAPE score, and predicting a number of the first set of tasks, wherein, for each iteration of the predetermined number of iterations, a new set of tasks are used as the first set of tasks, and the completion rate of the first set of tasks for the preceding iteration in the first time period is merged with the set of known tasks and are used to calculate the MAPE score and the volatility score for a next iteration.

\* \* \* \* \*